United States Patent
Bar et al.

(10) Patent No.: US 6,607,271 B2
(45) Date of Patent: Aug. 19, 2003

(54) METHOD FOR MOUNTING OPHTHALMIC LENSES

(75) Inventors: Nathalie Bar, Charenton-le-Pont (FR); Bruno Decreton, Charenton le, Pont (FR); Thierry Bonnin, Yerres (FR); Berangere Donetti, Champigny-sur-Marne (FR); Gilles Le Saux, Paris (FR)

(73) Assignee: Essilor International (FR)

(*) Notice: Subject to any disclaimer, the term of this patent is extended or adjusted under 35 U.S.C. 154(b) by 0 days.

(21) Appl. No.: 09/980,667

(22) PCT Filed: Mar. 13, 2001

(86) PCT No.: PCT/FR01/00743
§ 371 (c)(1),
(2), (4) Date: Jun. 17, 2002

(87) PCT Pub. No.: WO01/75511
PCT Pub. Date: Oct. 11, 2001

(65) Prior Publication Data
US 2002/0163621 A1 Nov. 7, 2002

(30) Foreign Application Priority Data
Mar. 31, 2000 (FR) .............................. 00 04143

(51) Int. Cl.$^7$ .................................. G02C 7/06

(52) U.S. Cl. ...................... 351/177; 351/169; 351/178
(58) Field of Search ............................. 351/168, 169, 351/170, 171, 172, 177, 178

(56) References Cited

U.S. PATENT DOCUMENTS 6,193,370 B1 * 2/2001 Shirayanagi ................. 351/177
6,199,983 B1 * 3/2001 Kato et al. .................. 351/169

FOREIGN PATENT DOCUMENTS

| FR | 2 220 803 | 10/1974 |
| FR | 2 620 927 | 3/1989 |
| FR | 2 663 528 | 12/1991 |
| WO | WO99/01791 | 1/1999 |

* cited by examiner

Primary Examiner—Scott J. Sugarman
(74) Attorney, Agent, or Firm—Fish & Richardson P.C.

(57) ABSTRACT

The invention relates to a method for fitting, in a frame, a progressive ophthalmic lens prescribed for a wearer. It proposes that only the horizontal position of the wearer's pupil be measured on the wearer. From this measurement, and from the total height of the pattern of the frame, the lens is positioned in the frame, and is then machined and fitted into the frame. The invention makes it possible, when fitting lenses, to avoid the errors brought about by the measuring of the height of the wearer's pupil with respect to the frame.

12 Claims, 1 Drawing Sheet

METHOD FOR MOUNTING OPHTHALMIC LENSES

Figure 1:
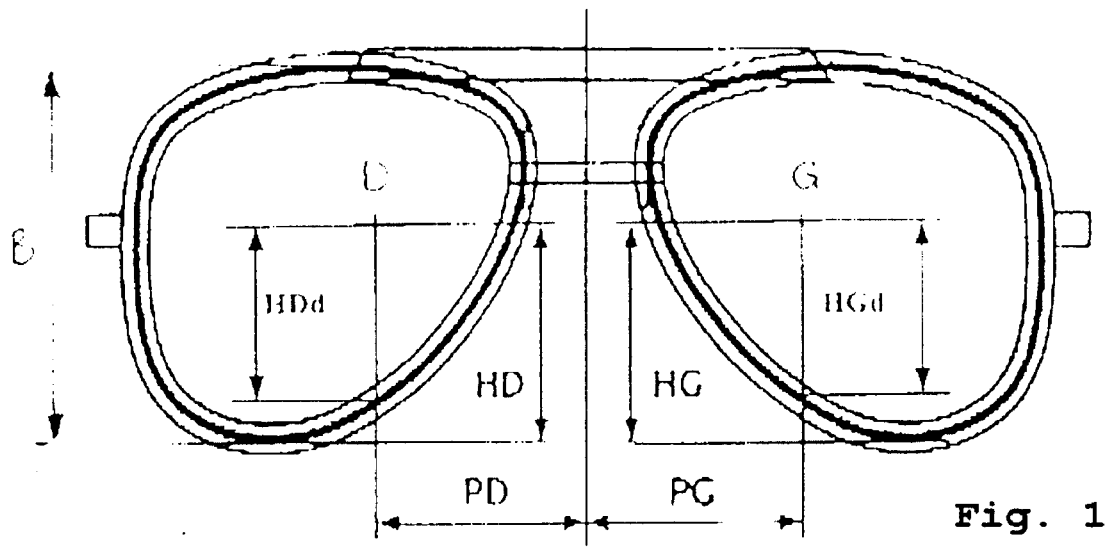

The invention relates to ophthalmic lenses and, more specifically, to the fitting of ophthalmic lenses in spectacle frames. The fitting of ophthalmic lenses in a frame, which is generally carried out by the optician, requires an amount of care that is proportional to the complexity of the lenses and to the power of the lens. Fitting consists first of all in positioning the lens with respect to the frame, then in machining the lens to fix it into the frame—or to fix the frame to the lens.

In the simplest case of lenses that have symmetry of revolution with an optical axis, the fitting of ophthalmic lenses begins with a step of tailoring to the frame. During this step, the optician identifies the position of the wearer's pupils, in the frame of reference of the frame, when the wearer has his head up and is looking at infinity. In other words, the optician determines the intersection of the gaze of each of the wearer's eyes and the plane of the corresponding lens in the frame, when the wearer has his head up and is looking at infinity. To do that, the optician asks his client to wear the spectacle frame and measures the pupillary distance or the pupillary half-distance and the height of the subject's pupils in the frame.

When the optician has identified the position in the frame of the two points of intersection, he fits the lenses, making the optical axis of the lenses coincide with the points thus determined. The optical center may be identified by the optician by means of a focometer, unless it is marked on the lens. The optician trims or skims the lenses; this operation allows excess material to be removed from the edges of the lens so that the lens has a shape tailored to the frame. It may also be necessary to give the edge of the lens a shape that is tailored to the frame. For further information on the trimming of lenses to the shape of the frame, reference may be made to U.S. Pat. No. 4,945,684.

Various devices have been developed to make it easier to measure the parameters needed for fitting lenses. EP-A-0 115 723 describes a device for measuring ocular parameters. The position of the pupil is determined by causing the corneal reflection, created by a source of light, to coincide with an adjustable reticule. The reticule is generated by means of a liquid-crystal matrix. Initially, the pupillary distance is measured without the frames, using a vertical reticule. Next, the subject puts on the chosen frame. The device makes it possible to measure the height of the pupil in the frame using a horizontal reticule. In this case, a horizontal line is used to visualize the lower edge of the frame.

The disadvantage with this system lies in the inaccuracy associated with the positioning of the apparatus with respect to the subject. What is more, such a device is unable to measure the various parameters simultaneously, and this increases the inaccuracy of the measurements.

FR-A-1 315 937 describes apparatus for photographing part of the face of the patient wearing his spectacle frame. This apparatus is equipped with an emulsion-type photosensitive sensor. The photograph obtained makes it possible to determine the various parameters needed to tailor the lenses to the frame. The device is designed to produce a photograph with a magnification of 1. For the magnification actually to be 1, the subject has to be situated a given distance away from the apparatus. The precision of the measurements will be governed, on the one hand, by the position of the subject with respect to the apparatus and, on the other hand, by the exploitation of the shot which does not directly yield the desired parameters.

In order to get around the constraint associated with the wearer-apparatus distance, FR-A-2 772 936 describes a method for calibrating the image acquired of a subject equipped with a spectacle frame. The method makes it possible to determine the scaling factor of the apparatus used. This may just as easily be apparatus in which the picture is taken using a photographic camera, or using a video camera. In both cases, in order to determine the ocular parameters of the subject, from the picture, it is necessary to know the scaling factor of the apparatus.

A framework is attached to the subject's frame. This framework has a reference zone of determined dimensional characteristics. Comparing the actual dimensions of this reference zone with those read off the picture makes it possible to determine the scaling factor.

WO-A-93/21819 proposes another type of device which makes it possible to measure, in addition to the pupillary distance and the height of the pupil in the frame, another parameter such as, for example, the lens-eye distance or pantoscopic angle. This type of apparatus has the advantage of taking into consideration parameters other than those commonly used, but does not solve the problem of precisely positioning the wearer's head in the frame of reference of the apparatus. The positioning of the subject's head in the frame of reference of the apparatus is an major source of errors. What happens is that if the subject tips his head forward slightly or turns his head slightly, the determination of the positions of the pupils, even if performed accurately, will not give the correct reference for fitting the lenses.

Fitting more complex lenses—progressive lenses, lenses for astigmatism sufferers or, more generally, any lenses which do not have symmetry of revolution and therefore do not have an optical axis—is performed in roughly the same way. The difference is that the lens is positioned with respect to the frame using reference points which are embodied on the lens by microetchings or any other means; it is also possible, for fitting, to use points which are not embodied on the lens, and the position of which is calculated by the optician.

By way of example, progressive ophthalmic lenses may be fitted as explained now. Progressive ophthalmic lenses are prescribed to those with presbyopia, and have a power which depends on the position of the lens. Such lenses are well known in the state of the art, and FR-A-2 769 998, FR-A-2 769 999 and FR-A-2 770 000 may, in particular, be consulted for further details about their characteristics. These lenses generally have a point known as the fitting cross, embodied on their front face, and which is used by the opticians for fitting. In a given frame, the wearer's gaze when he has his head up and is looking at infinity needs to pass through the fitting cross. In the case of the lenses of the applicant company, the fitting cross is situated four millimeters above the geometric center of the lens.

Progressive lenses may also have microetchings, in the form of two circles. The middle of the segment defined by the two circles—the middle of the microetchings—is at a determined distance from the fitting cross. In the progressive lenses of the applicant company, the middle of the microetchings is 4 mm below the fitting cross.

The method currently recommended by the applicant company for fitting progressive lenses is as follows. A lens prescribed for a wearer is defined by the power needed by the wearer for distance vision, possibly the value of the astigmatism that is to be corrected, and the value of the addition or of the power needed for close vision. The mean sphere of the lens at a point known as the reference point for distance vision is called the base. The addition is the difference in the mean sphere between a reference point for close vision and this reference point for distance vision. The wearer chooses a frame. The optician measures the wearer's physiological parameters, for the frame, as depicted in FIG. 1. This figure gives a depiction of a frame and of the position of the right and left pupils of the wearer in the frame, which are referenced D and G respectively. The figure depicts, in bold line in the case of the frame, the circumference of the lens, and in fine line, the interior and exterior limits of the frame. A plastic element, of flat shape, the circumference of which corresponds to the bottom of the bezel of the frame, is known as the frame pattern. The pattern therefore has the exterior shape that the lens, once trimmed, needs to exhibit so that it can be fitted into the frame. The height of the pattern determined in the Boxing system, that is to say according to ISO8624 regarding systems for measuring spectacle frames, will hereinafter be termed the total height of the pattern, (B). This height corresponds to the height of a rectangle in which the lens will fit once trimmed. The distance between the user's two pupils will be known as the pupillary distance. To fit progressive lenses, an optician measures the right pupillary half-distance and the left pupillary half-distance, which are referenced PD and PG. The left (or right) half-distance is the distance between the vertical axis of symmetry of the frame and the center of the left (or right) pupil. The vertical distance between the right (or left) pupil and the lowermost point of the right (or left) half-frame will be termed the right (or left) height. These quantities are denoted HD and HG in the figure. For fitting progressive lenses, the optician then measures the heights referenced HDd and HGd in the figure. These right and left reference heights are, respectively, the distances between the right or left pupil and the right or left intersection, between a vertical straight line passing through the pupil and the frame in its lower part. The measurements of the pupillary distance and of the height of the pupil with respect to the frame are taken for a wearer in a given position, namely for the wearer with his head up looking at infinity; the devices of the state of the art which were mentioned above can be used for this purpose.

The characteristics of a given frame can be measured on the frame, using apparatus known per se. By way of example, U.S. Pat. No. 5,333,412 describes a device that makes it possible, in three dimensions, to measure the shape of the bottom of the bezel of the frame. The shape thus determined then allows the height B to be calculated. The characteristics of a frame may also be given directly by the manufacturer depending on the model chosen by the wearer.

From the data thus defined, each lens is trimmed so that the fitting cross lies in the frame facing the pupil of the corresponding eye, when the wearer has his head up and is looking at infinity. Thus, when the wearer of the frame has his head up and is looking at infinity, his gaze passes through the lens at the fitting cross. It is of course possible, if the fitting cross is not embodied on the lens, to use, for the positioning of the lenses, the middle of the microetchings, after correcting by the distance between this middle and the fitting cross.

This method of fitting progressive lenses is satisfactory. It does, however, have the disadvantage of depending on the optician's ability to precisely take the measurements of the pupillary half-distances and of the height with respect to the frame. The pupillary half-distances can generally be measured with better precision than the heights with respect to the frame.

The solutions proposed in the state of the art for solving the problems with the precision of measurement by opticians consist in proposing more complex measurement apparatus in an attempt to reduce the error on the measurement, such as the apparatus of the state of the art mentioned hereinabove.

The article "Ophthalmic lenses and dispensing Part one-Lens centration", Mo Jalie, Oct. 20, 1995, Optician No. 5524 vol 210, insists on the importance of correctly centering the lenses intended for the wearer. This entails correctly fitting the lenses into the frame chosen by the wearer. This article describes various methods used for the horizontal and vertical centering.

Even though the apparatus is proposed to the opticians with a view to making it easier to measure the pupillary distance and the height of the pupil in the frame, the positioning of the wearer's head in the frame of reference of the apparatus is still a major source of error. Another problem is that the precision of the measurements depends on the individuals performing the fitting, and is not necessarily repeatable.

An object of the invention is a solution to the problems posed by fitting ophthalmic lenses. The invention makes it possible to avoid the error on the measurements of height with respect to the frame leading to incorrect positioning of the lens with respect to the wearer's pupil, for a given frame. It applies to the fitting of lenses of all types.

More specifically, the invention proposes a method for fitting, in a frame, an ophthalmic lens prescribed for a wearer, comprising the steps of measuring the horizontal position of the wearer's pupil;

determining the total height (B) of the pattern of the frame;

positioning the lens in the frame according to the horizontal position measured and according to the total height (B), and trimming the lens and fitting the lens in the frame.

The positioning step involves positioning, at a distance h vertically above the lower edge of the pattern of the frame, the point of the lens through which the wearer's gaze has to pass when he has his head up and is looking at infinity, with $$h=\text{Int}(0.5\ B+5.5) \text{ for } 31 \leq B \leq 35 \quad (1)$$

$$h=\text{Int}(0.5\ B+4.5) \text{ for } 36 \leq B \leq 50 \quad (2)$$

where B is the total height of the pattern of the frame, and Int is the function for the integer part.

This solution applies in particular to progressive lenses, but also applies to non-progressive lenses.

It is advantageous for the point of the lens through which the wearer's gaze has to pass when he has his head up and is looking at infinity to be embodied on the surface of the lens by a fitting cross.

In another embodiment, the lens is a progressive lens on which microetchings are embodied, and the positioning step involves positioning, at a distance h vertically above the lower edge of the pattern of the frame, the middle of the microetchings, with $$h=\text{Int}(0.5\ B+5.5-d) \text{ for } 31 \leq B \leq 35 \quad (3)$$

$$h=\text{Int}(0.5\ B+4.5-d) \text{ for } 36 \leq B \leq 50 \quad (4)$$

where B is the total height of the pattern of the frame, and Int is the function for the integer part and d is the vertical distance on the lens between the middle of the microetchings and the point of the lens through which the wearer's gaze has to pass when he has his head up and is looking at infinity.

In both instances, the step of measuring the horizontal position of the wearer's pupil may involve measuring the wearer's pupillary half-distance.

Determining the total height (B) of the pattern of the frame preferably involves measuring the shape of the frame at the bottom of the bezel.

The invention also proposes spectacles with a frame and lenses, obtained according to such a method.

Figure 2:
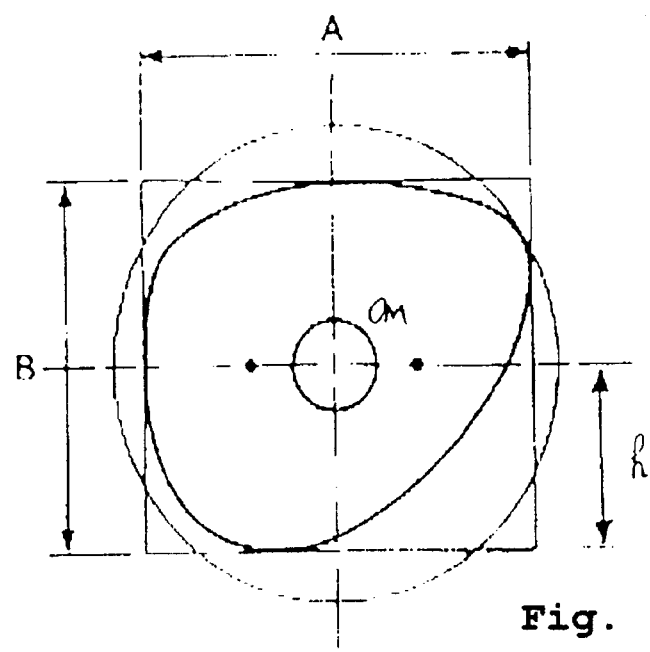

Other characteristics and advantages of the invention will become apparent from reading the description which follows of some embodiments of the invention, which description is given by way of example and with reference to the appended drawings which show:

FIG. 1 a depiction of the physiological parameters of a wearer for a given frame;

FIG. 2 a depiction of a circumference of a lens, before and after trimming.

Unlike the solutions of the prior art, the invention proposes to fit ophthalmic lenses into a frame not by measuring the pupillary distance or pupillary half-distance and the height of the pupil with respect to the lens, but by measuring only the pupillary half-distance and by using the total height of the pattern of the frame. It relies, from a statistical analysis of a great many data, on the observation that, for frames and wearers, there is a relationship between the total height of the pattern of the frame and the pupillary height. Thus, fitting a lens into a frame can be performed by measuring on the patient only the pupillary half-distance; knowledge of the total height of the pattern of the frame then makes it possible to calculate the position of the lens in the frame.

The method of the invention makes it possible to fit an ophthalmic lens, for a given frame shape, from the sole measurement on the patient of the pupillary distance. This measurement is less prone to errors than the measurement of the pupillary height on a frame worn by the wearer. The height of the pattern of the frame is supplied by the frame manufacturer, or can be measured on the frame without the wearer; there are fewer sources of error.

The invention is described hereinbelow in the example of a progressive lens for the right eye, with a fitting cross. It applies in the same way to a lens for the left eye, or to lenses which are not progressive, or alternatively to lenses which do not have a fitting cross.

FIG. 2 shows a depiction of the circumference of an ophthalmic lens, before and after trimming. In the figure, the single line corresponds to the circumference of the lens before trimming; in a conventional way, the lens may be obtained by molding and have a circular shape. The bold line corresponds to the circumference of the pattern of the frame, which is also the circumference of the lens after the lens has been trimmed. This trimming of the lens allows the lens to be fitted later into the frame.

The figure shows the total width A of the pattern of the frame and the total height B of this pattern, and the rectangle in which the trimmed lens will fit. As explained earlier, the positioning of the lens in the frame consists in determining the desired position of the lens in the frame using notable points of the lens. As explained above, use may be made of the fitting cross of the lens, the middle of microetchings embodied on the surface of the lens, or alternatively the optical center in the case of a unifocal lens. In FIG. 2, the fitting cross is at the center of the circle marked CM.

In the case of a lens which does not have symmetry of rotation, it is also necessary to position the lens angularly in the frame. This angular positioning depends on the manufacturer's specifications and, in particular in the case of progressive lenses, on the appearance of the main progression meridian; in the case of progressive lenses by the applicant company, the main progression meridian is inclined from the temporal side to the nasal side, and the lens has to be fitted in such a way that the microetchings are horizontal. The state of the art has also proposed lenses which have a straight main progression meridian, which are inclined toward the nasal side on fitting.

The horizontal position of the fitting cross in the lens is determined by measuring the pupillary half-distance; this measurement may be taken in a way known per se, on the wearer, with or without the frame. The fitting cross is positioned in the frame in such a way that the fitting cross is on the same vertical line as the wearer's pupil, in the reference position chosen by the optician for the measurement. In the fitting recommended by the applicant company, this reference position is the head-up position, with the wearer looking straight in front of him at infinity. Measuring the wearer's pupillary half-distance provides a measure of the horizontal position of the wearer's pupil with respect to the frame.

The vertical position of the point of reference situated on the lens and used for fitting—which is the fitting cross in the progressive lens example considered here—is, according to the invention, determined from the total height of the pattern of the lens. It is possible, in order to determine the height of the fitting cross, to use the following relationships:

$$h=\text{Int}(0.5\ B+5.5) \text{ for } 31 \leq B \leq 35 \quad (1)$$

$$h=\text{Int}(0.5\ B+4.5) \text{ for } 36 \leq B \leq 50 \quad (2)$$

where h is the height of the fitting cross, expressed in millimeters, as depicted in FIG. 2, that is to say the distance along a vertical line between the fitting cross and the lower edge of the pattern of the frame;

B is the total height of the pattern of the frame, expressed in millimeters, as depicted in FIG. 2; and Int is the function for the integer part, which to a real number associates the integer which is the same or immediately below.

Relationships (1) and (2) make it possible to calculate the fitting height of the lens with respect to the frame without measuring on the wearer. In other words, these relationships make it possible to position the lens vertically, by virtue of the fitting cross, without measuring the vertical position of the pupil on the wearer.

The invention thus makes it possible to determine the vertical and horizontal position of the fitting cross with respect to the frame, and therefore to position the lens with respect to the frame. Depending on the position of the fitting cross in the frame, it is possible to proceed, as in the prior art, to trimming of the lens, to allow it to be fitted into the frame.

The invention makes it possible to avoid the errors in measuring the height of the pupil with respect to the frame, in the reference position of the wearer. All that is required according to the invention is for the pupillary half-distance to be measured on the wearer. The mere fact of reducing the number of measurements to be taken for fitting the lenses makes it possible to improve the precision with which they are fitted.

The invention therefore positions the lens at least roughly equivalently to the positioning obtained by the method of the state of the art, and in a way which is simpler for the optician, in that just one measurement needs to be taken, rather than the two that were required previously.

The invention applies to the case of progressive lenses which have a fitting cross, as explained in the example. In the case of unifocal lenses, the same formulae may be used for positioning the optical center of the lens with respect to the frame.

Furthermore, when the surface of the lens has no markings to identify the fitting cross, the reference point for a progressive lens may then be the middle of the microetchings, in which case the fitting height is given by the following relationships:

$$h=\text{Int}(0.5\,B+5.5-d) \text{ for } 31\leq B\leq 35 \quad (3)$$

$$h=\text{Int}(0.5\,B+4.5-d) \text{ for } 36\leq B\leq 50 \quad (4)$$

with the same notations as above, d being a correction factor equal to the distance measured vertically on the lens between the middle of the microetchings and the position of the wearer's eye with his head up looking at infinity, recommended by the manufacturer.

The invention is therefore applicable regardless of the point of reference used for positioning the lens—fitting cross, optical center, or some other point.

Of course, the present invention is not restricted to the exemplary embodiments and methods described and depicted, but can be varied in numerous ways accessible to those skilled in the art. Thus, a different formula than those proposed above can be used for pattern heights less than or equal to 30 mm or greater than or equal to 51 mm.

The principle can just as easily be applied to the case of "rimless" frames, that is to say ones in which the sides and the bridge are screwed onto the lens, without the frame going round each of the lenses. In this case, the height B is the height of the shape of the lens chosen by the wearer.

What is claimed is:

1. A method for fitting, in a frame, an ophthalmic lens prescribed for a wearer, the method comprising the steps of:

measuring the horizontal position of the wearer's pupil;

determining the total height (B) of the pattern of the frame;

positioning the lens in the frame according to the horizontal position measured and according to the total height (B); and trimming the lens and fitting the lens in the frame, wherein the positioning step involves positioning, at a distance h vertically above the lower edge of the pattern of the frame, the point of the lens through which the wearer's gaze has to pass when he has his head up and is looking at infinity, with $$h=\text{Int}(0.5B+5.5) \text{ for } 31\leq B\leq 35 \quad (1)$$

$$h=\text{Int}(0.5B+4.5) \text{ for } 36\leq B\leq 50 \quad (2)$$

where B is the total height of the pattern of the frame, and Int is the function for the integer part.

2. The method of claim 1, wherein the point of the lens through which the wearer's gaze has to pass when he has his head up and is looking at infinity is embodied on the surface of the lens by a fitting cross.

3. The method of claim 1, wherein the lens is a progressive lens.

4. The method of claim 1 wherein the step of measuring the horizontal position of the wearer's pupil involves measuring the wearer's pupillary half-distance.

5. The method of claim 1 wherein the step of determining the total height (B) of the pattern of the frame involves measuring the shape of the frame at the bottom of the bezel.

6. The method of claim 1 wherein the step of measuring the horizontal position of the wearer's pupil involves measuring the wearer's pupillary half-distance, and wherein the step of determining the total height (B) of the pattern of the frame involves measuring the shape of the frame at the bottom of the bezel.

7. Spectacles with a frame and lenses, obtained according to the method of claim 1.

8. A method for fitting, in a frame, a progressive ophthalmic lens prescribed for a wearer, on which microetchings are embodied, the method comprising the steps of measuring the horizontal position of the wearer's pupil;

determining the total height (B) of the pattern of the frame;

positioning the lens in the frame according to the horizontal position measured and according to the total height (B); and trimming the lens and fitting the lens in the frame, wherein the positioning step involves positioning, at a distance h vertically above the lower edge of the pattern of the frame, the middle of the microetchings, with $$h=\text{Int}\,(0.5B+5.5-d) \text{ for } 31\leq B\leq 35 \quad (3)$$

$$h=\text{Int}\,(0.5B4.5-d) \text{ for } 36\leq B\leq 50 \quad (4)$$

where B is the total height of the pattern of the frame, and Int is the function for the integer part and d is the vertical distance on the lens between the middle of the microetchings and the point of the lens through which the wearer's gaze has to pass when he has his head up and is looking at infinity.

9. The method of claim 8, wherein the step of measuring the horizontal position of the wearer's pupil involves measuring the wearer's pupillary half-distance.

10. The method of claim 8, wherein the step of determining the total height (B) of the pattern of the frame involves measuring the shape of the frame at the bottom of the bezel.

11. The method of claim 8, wherein the step of measuring the horizontal position of the wearer's pupil involves measuring the wearer's pupillary half-distance, and wherein the step of determining the total height (B) of the pattern of the frame involves measuring the shape of the frame at the bottom of the bezel.

12. Spectacles with a frame and lenses, obtained according to the method of claim 8.

* * * * *

UNITED STATES PATENT AND TRADEMARK OFFICE
CERTIFICATE OF CORRECTION

PATENT NO.     : 6,607,271 B2
DATED          : August 19, 2003
INVENTOR(S)    : Nathalie Bar et al.

It is certified that error appears in the above-identified patent and that said Letters Patent is hereby corrected as shown below:

<u>Title page,</u>
Item [*] Notice, replace "0 days" with -- 316 days --

<u>Column 2,</u>
Line 25, replace "an" with -- a --

<u>Column 8,</u>
Line 33, replace "(0.5B4.5-d)" with -- (0.5B + 4.5 − d) --

Signed and Sealed this

Thirteenth Day of April, 2004

JON W. DUDAS
*Acting Director of the United States Patent and Trademark Office*